United States Patent
Kasahara (10) Patent No.: US 9,766,838 B2
(45) Date of Patent: Sep. 19, 2017

(54) IMAGE PROCESSING APPARATUS, IMAGE PROCESSING APPARATUS CONTROL METHOD, AND PROGRAM

(71) Applicant: CANON KABUSHIKI KAISHA, Tokyo (JP)

(72) Inventor: Kimito Kasahara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/326,944

(22) Filed: Jul. 9, 2014

(65) Prior Publication Data

US 2015/0015912 A1    Jan. 15, 2015

(30) Foreign Application Priority Data

Jul. 10, 2013    (JP) ................................. 2013-144524

(51) Int. Cl.
    G06F 15/00    (2006.01)
    G06F 3/12     (2006.01)
(52) U.S. Cl.
    CPC .......... *G06F 3/1206* (2013.01); *G06F 3/1247* (2013.01); *G06F 3/1271* (2013.01); *G06F 3/1285* (2013.01)
(58) Field of Classification Search
    None
    See application file for complete search history.

(56) References Cited

U.S. PATENT DOCUMENTS

| 2006/0265644 | A1* | 11/2006 | Koizumi ........................ 715/522 |
| 2007/0206225 | A1* | 9/2007 | Shinohara .......... H04N 1/00127 358/1.16 |
| 2010/0110493 | A1* | 5/2010 | Kato ........................... 358/1.15 |
| 2010/0225966 | A1* | 9/2010 | Bailey et al. ................ 358/1.15 |
| 2011/0055356 | A1* | 3/2011 | Nonaka ................ G06F 3/1222 709/219 |
| 2013/0081146 | A1* | 3/2013 | Hakozaki ........................ 726/28 |
| 2013/0202222 | A1* | 8/2013 | Saito .................... G06F 3/1206 382/305 |
| 2014/0240740 | A1* | 8/2014 | Salgado ....................... 358/1.13 |

FOREIGN PATENT DOCUMENTS

| JP | 2001216068 A |   | 8/2001 |
| JP | 2007245500 A | * | 9/2007 |
| JP | 2009176316 A |   | 8/2009 |
| JP | 2011-131382 A |   | 7/2011 |

* cited by examiner

*Primary Examiner* — Huo Long Chen
(74) *Attorney, Agent, or Firm* — Canon U.S.A., Inc. IP Division (57) ABSTRACT

In an image processing apparatus that communicates with a server apparatus, specific information indicating a function of the server apparatus is acquired from the server apparatus in advance. The image processing apparatus performs control so that, when data to be printed is selected, data to be printed which cannot be converted, and for which it is determined based on the acquired specific information that the server apparatus cannot perform conversion cannot be selected as a printing candidate.

14 Claims, 11 Drawing Sheets

IMAGE PROCESSING APPARATUS, IMAGE PROCESSING APPARATUS CONTROL METHOD, AND PROGRAM

BACKGROUND

Field

Aspects of the present invention generally relate to an image processing apparatus, an image processing apparatus control method, and a program.

Description of the Related Art

Conventionally, a technology has been known in which an image processing apparatus that performs printing by receiving designation of a file to be printed transmits the file to be printed to an image processing server. The image processing server (server apparatus) converts the file into print data that can be interpreted by the image processing apparatus, and the image processing apparatus prints this print data (e.g., Japanese Patent Application Laid-Open No. 2011-131382).

However, in Japanese Patent Application Laid-Open No. 2011-131382, since the image processing apparatus cannot know the file formats that can be processed by the image processing server, there can be cases in which files that cannot be processed by the processing server are also transmitted to the processing server.

SUMMARY

Aspects of the present invention are generally directed to a technique in which print data that cannot be converted by a server apparatus is not displayed.

According to an aspect of the present disclosure, an image processing apparatus capable of communication with a server apparatus includes a conversion unit configured to convert data to be printed into printable print data, an acquisition unit configured to acquire specific information indicating a function of the server apparatus, and a control unit configured to perform control so that, from among the data to be printed, data to be printed that cannot be converted by the conversion unit, and for which it was determined, based on the acquired specific information, that the server apparatus cannot perform conversion, cannot be selected as a printing candidate.

Further features of the present disclosure will become apparent from the following description of exemplary embodiments with reference to the attached drawings.

DESCRIPTION OF THE EMBODIMENTS

Various exemplary embodiments will be described in detail below with reference to the drawings.

<Description of System Configuration>

Figure 1:
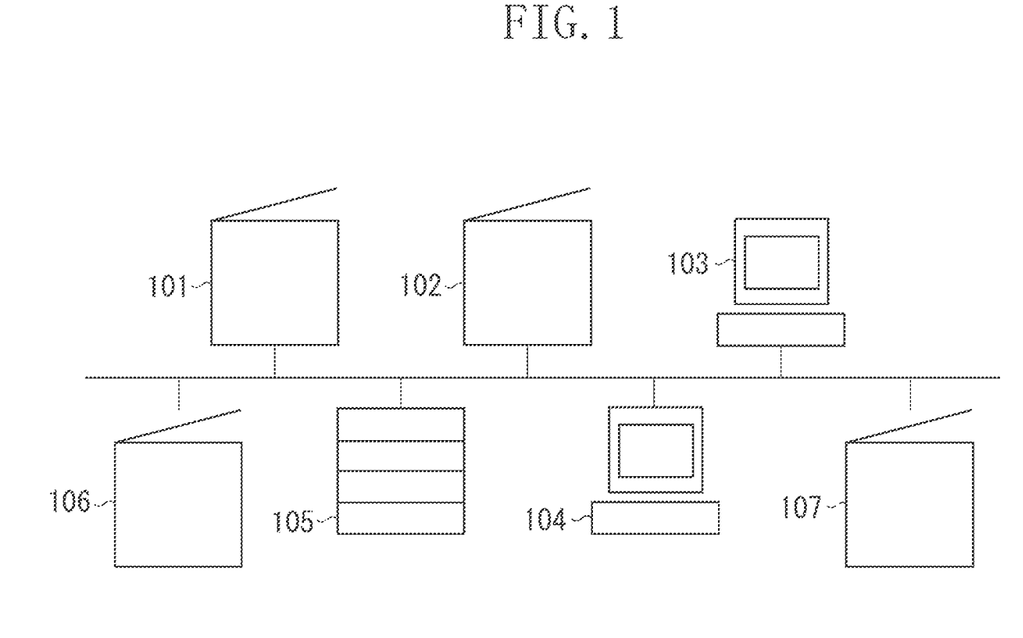
FIG. 1 illustrates an example of an image forming system in which an image processing apparatus is employed.

FIG. 1 illustrates an example of an image forming system in which an image processing apparatus according to a first exemplary embodiment is employed. The image forming system according to this example is configured from a plurality of image processing apparatuses, including image processing apparatuses 101, 102, 106, and 107, information processing terminals (information processing apparatuses) 103 and 104, and an image processing server 105. Each of these apparatuses is communicably connected to the others via a network. The image processing server 105 may be, for example, a server apparatus that is adapted to a cloud computing environment. Further, each of the image processing apparatuses may have either the same processing capability or different processing capability. The present invention can be applied even in an environment in which for example, image processing apparatuses capable of color output and image processing apparatuses capable of monochrome output are combined.

The image processing apparatuses will now be described using the image processing apparatus 101 as a representative example. The term network used here may refer to any method in which apparatuses in an image forming system can communicate with each other, such as a local area network (LAN), the Internet and the like.

The image processing apparatus 101 can print an image when an image data print request is received from the information processing terminal 103. Further, the image processing apparatus 101 can also read an image of a document using a scanner that is installed in the apparatus, and print the read image.

In addition, the image processing apparatus 101 can present the user with the content of a server message block (SMB) shared folder in the information processing terminal or a universal serial bus (USB) memory that is connected to the image processing apparatus 101, and print a file selected by the user from among this content. Further, the image processing apparatus 101 can make the image processing server 105 perform image processing that it cannot perform itself by issuing a request to the image processing server 105.

The image processing server 105 receives processing content instruction data and data to be processed from the image processing apparatus. The image processing server 105 performs the instructed processing on the data to be processed, and returns the output data to the image processing apparatus that issued the request.

Figure 2:
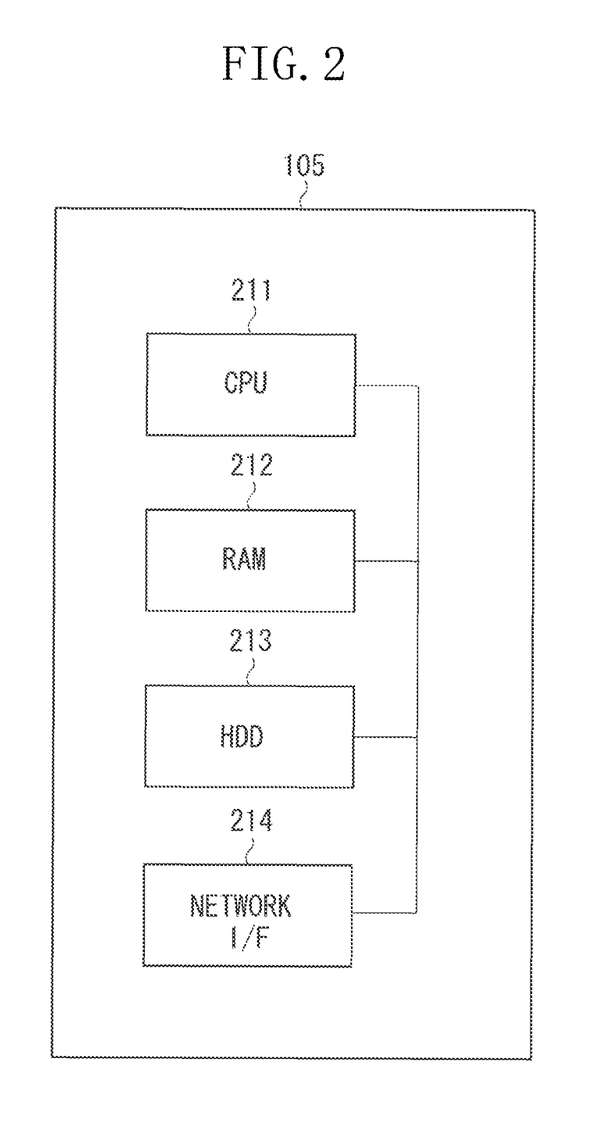
FIG. 2 is a block diagram illustrating an example of a configuration of the image forming server illustrated in FIG. 1.

FIG. 2 is a block diagram illustrating an example of a configuration of the image processing server 105 illustrated in FIG. 1.

The image processing server 105 is configured from a central processing unit (CPU) 211, a random-access memory (RAM) 212, a hard disk drive (HDD) 213, and a network interface (I/F) 214. The CPU 211, which controls the overall apparatus, can control the transmission and reception of data among the RAM 212, the HDD 213, and the network I/F 214. Further, the CPU 211 opens control programs (commands) read from the HDD 213 in the RAM 212, and executes commands stored in the RAM 212.

The HDD 213 stores control programs (commands) executable by the CPU 211 for realizing the below-described processing that is specific to the present invention. In addition, the HDD 213 can appropriately store information relating to file formats that can be processed by the image processing server 105, and data received from the image processing apparatus, such as processing content instruction data and data to be processed. The RAM 212, which enables a command stored in the HDD 213 to be opened and read from the CPU 211, can store various types of data required to execute the command.

The network I/F 214 performs network communication with an apparatus in the image forming system. The network I/F 214 notifies reception of data to the CPU 211, and transmits data on the RAM 212 to the network.

Figure 3:
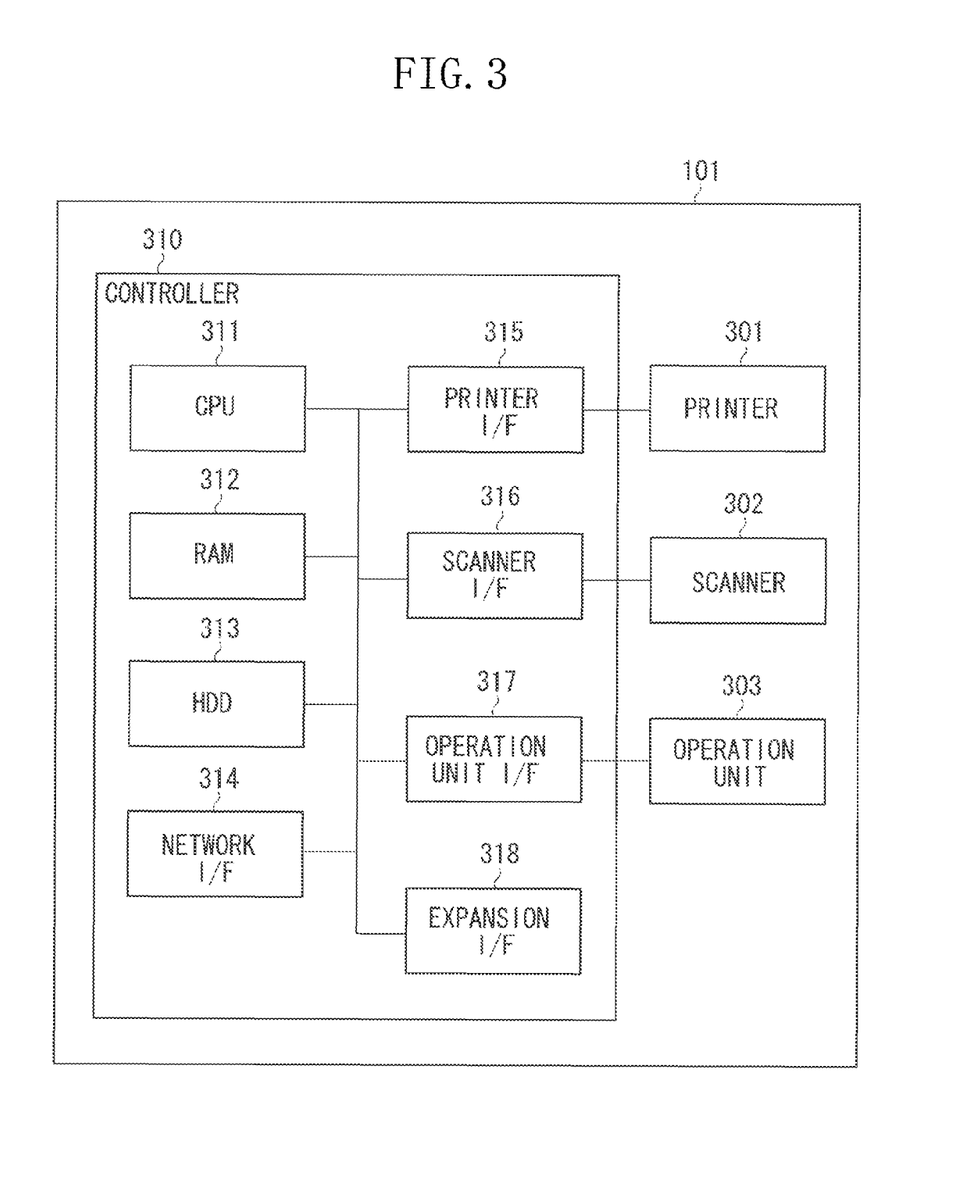
FIG. 3 is a block diagram illustrating an example of a configuration of the image processing apparatus illustrated in FIG. 1.

FIG. 3 is a block diagram illustrating an example of a configuration of the image processing apparatus 101 illustrated in FIG. 1.

In FIG. 3, the image processing apparatus 101 is configured from a controller 310, a printer 301, a scanner 302, and an operation unit 303. The controller 310 is configured from a CPU 311, a RAM 312, a HDD 313, a network I/F 314, a printer I/F 315, a scanner I/F 316, an operation unit I/F 317, and an expansion I/F 318.

The CPU 311 can transmit and receive data to and from the RAM 312, the HDD 313, the network I/F 314, the printer I/F 315, the scanner I/F 316, and the operation unit I/F 317. Further, the CPU 311 opens a command read from the HDD 313 in the RAM 312, and executes a command stored in the RAM 312.

The HDD 313 can store commands executable by the CPU 311, setting values used by the apparatus, and data relating to processing requested by the user. The RAM 312, which enables a command stored in the HDD 313 to be opened and read from the CPU 311, can store various types of data required to execute the command.

The network I/F 314 performs network communication with an apparatus in the image forming system. The network I/F 314 notifies reception of data to the CPU 311, and transmits data on the RAM 312 to the network. The printer I/F 315 transmits image data transmitted from the CPU 311 to the printer 301, and transmits to the CPU 311 a state of the printer acquired from the printer 301.

The scanner I/F 316 transmits an image reading instruction transmitted from the CPU 311 to the scanner 302, transmits image data received from the scanner 302 to the CPU 311, and transmits to the CPU 311 a state received from the scanner 302.

The operation unit I/F 317 transmits to the CPU 311 an instruction from the user input from the operation unit 303, and transmits to the operation unit 303 image information for the user to operate on.

The printer 301 prints image data received from the printer I/F on a sheet, and transmits to the printer I/F a state of the printer.

The scanner 302 reads a sheet placed on the scanner, converts the read sheet into digital data, and transmits the converted digital data to the scanner I/F 316 based on an image reading instruction received from the scanner I/F 316. Further, the scanner 302 transmits a state of the scanner 302 (e.g., the number of read pages, detected jams (double feed)) to the scanner I/F 316. Further, the scanner 302, which includes a function of reading both sides of a document in one scan of the document, can print both sides of the document together on one page based on processing by the CPU 311.

The operation unit 303 enables the user to operate the image processing apparatus 101. For example, the operation unit 303 may include a liquid crystal screen having a touch panel, which provides an operation screen for the user and receives operations from the user.

The expansion I/F 318 is an I/F that can connect an external device to the image processing apparatus 101. For example, the expansion I/F 318 may include a USB format I/F, which can connect to an external storage device such as a USB memory, and perform reading and writing of data.

Figures 4, 4A:
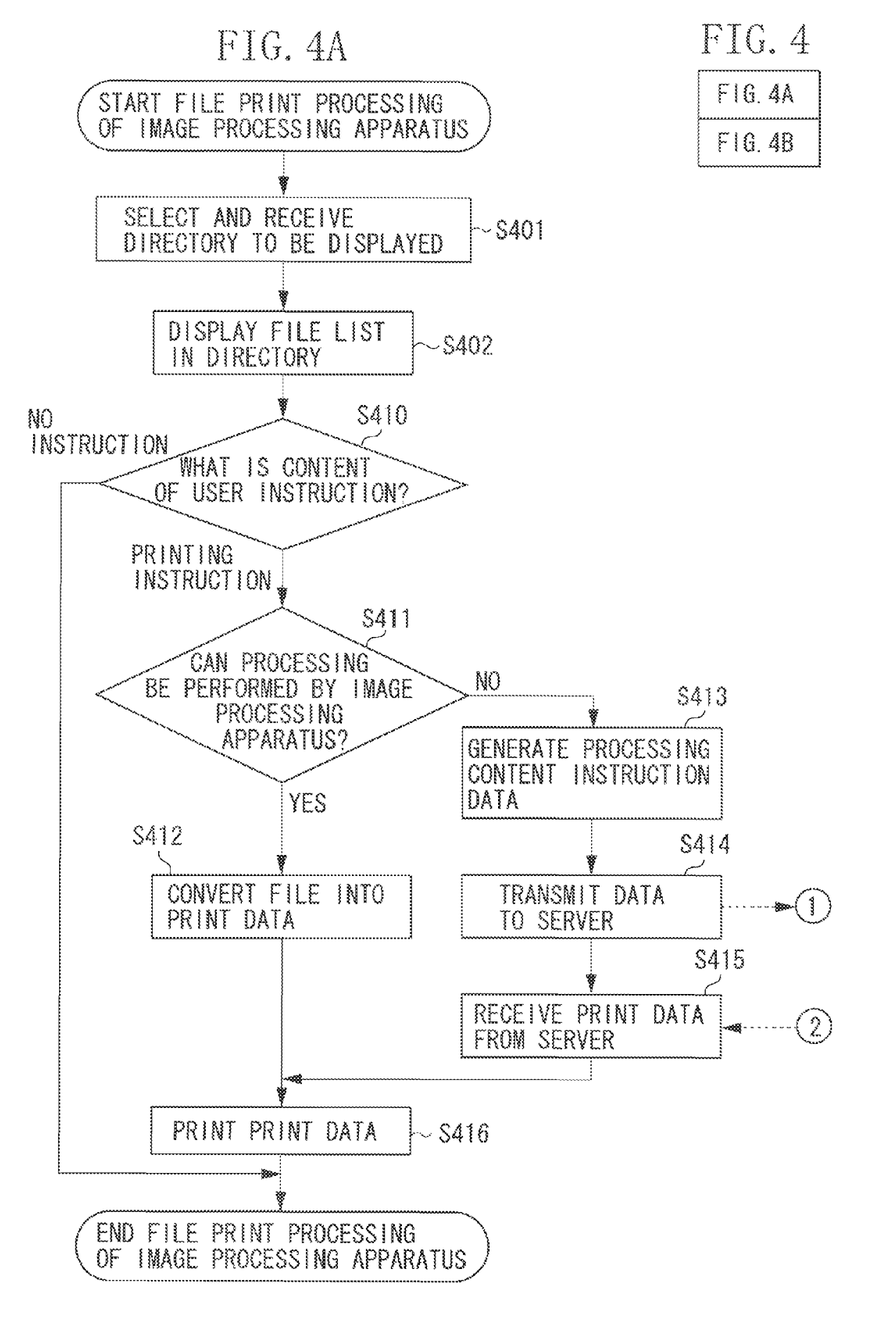
FIGS. 4A and 4B are a flowchart illustrating an image processing system control method.
Figure 4B:
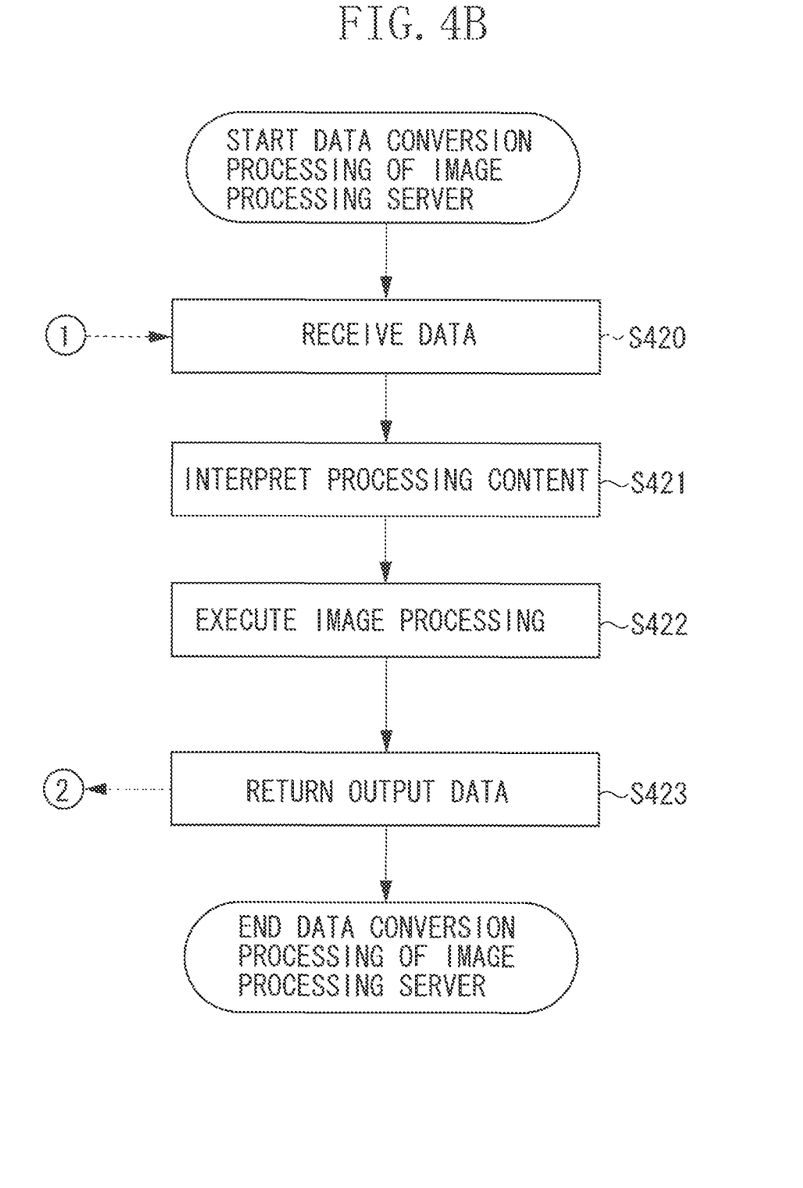

FIGS. 4A and 4B are a flowchart illustrating an image processing system control method according to the present exemplary embodiment. This flowchart represents an example of processing executed by the image processing apparatus 101 and the image processing server 105 when the user selects and prints a file in a specific directory using the operation unit 303 of the image processing apparatus 101. The flowchart illustrated in FIG. 4A represents the processing performed by the image processing apparatus 101, and the flowchart illustrated in FIG. 4B represents the processing performed by the image processing server 105.

Further, each step in the flowchart relating to the image processing apparatus according to the present application is realized by the CPU 311 of the image processing apparatus 101 illustrated in FIG. 3 executing the above-described control program. The CPU 311 executes these steps using various information stored in the HDD 313 of the image processing apparatus and information transmitted and received by the network I/F 314.

In step S401, the CPU 311 prompts the user to select a directory in which files are stored via the operation unit 303, and receives the selected directory. Examples of a directory to be selected include a predefined SMB shared folder in the information processing terminal 103, a USM memory connected to the image processing apparatus 101, and the like. However, the directory to be selected is not limited to these examples, and it may be placed in any location accessible from the image processing apparatus 101.

Next, in step S402, the CPU 311 displays the content of the directory selected in step S401 on the operation unit 303 as a file selection screen. In the present exemplary embodiment, only files that can be processed by the image forming system are displayed on the operation unit 303 by the image processing apparatus 101. Therefore, files in a format that cannot be processed by either the image processing apparatus 101 or the image processing server 105 are not displayed.

However, another display method may be employed, such as a method that displays files that cannot be processed so that the files that cannot be processed are distinguished from files that can be processed, by graying them out, for example. The content of the screen displayed on the operation unit 303 by the CPU 311 in this step will be described below.

Next, in step S410, the CPU 311 receives a file printing instruction given by the user from the file selection screen displayed in step S402. If it is determined by the CPU 311 that the user has closed the screen without issuing a file printing instruction (NO INSTRUCTION in step S410), the CPU 311 finishes the file print processing.

On the other hand, if the CPU 311 determines in step S410 that the user selected a file as a file to be printed, and issued a file printing instruction (PRINTING INSTRUCTION in step S410), the processing proceeds to step S411. In step S411, the CPU 311 further determines whether it can perform by itself the printing of the file to be printed. As a result, it is determined whether the image processing apparatus 101 can convert the data to be printed into printable print data.

If the CPU 311 determines in step S411 that it can process by itself the file to be printed (Yes in step S411), the processing proceeds to step S412. In step S412, the CPU 311 converts the file to be printed into print data. Then, in step S416, the CPU 311 prints the print data, and finishes this processing.

On the other hand, if the CPU 311 determines in step S411 that it cannot process by itself the file to be printed (No in step S411), in step S413, the CPU 311 generates on the RAM 312 conversion instruction data corresponding to the instruction content given by the user. This conversion instruction data includes parameter information, such as the file format of input data, the file format of output data, image resolution, and color mode, which are used when requesting the image processing server to perform processing. These pieces of parameter information are set using the operation screen of the image processing apparatus 101 when executing the printing instruction in step S410. In the present exemplary embodiment, an instruction to convert the file to be printed into a file format that can be printed by the image processing apparatus 101 is described in the conversion instruction data.

Then, in step S414, the CPU 311 transmits the file to be printed and the conversion instruction data generated in step S413 to the image processing server 105.

In step S415, the CPU 311 of the image processing apparatus 101 waits until the print data is returned from the image processing server 105 to receive print data. This print data is obtained by the image processing server 105 converting the file to be printed into a data format that can be processed by the image processing apparatus 101.

Lastly, in step S416, the CPU 311 prints the print data received in step S415 from the printer 301, and finishes this processing.

Next, processing performed on the image processing server side illustrated in FIG. 4B will be described. Each step in the flowchart relating to the image processing server according to the present invention is realized by the CPU 211 executing the above-described control program. The CPU 211 executes these steps using various information stored in the HDD 213 of the image processing server and information transmitted and received by the network I/F 214. Further, the CPU 211 of the image processing server 105 performs the processing by writing required temporary data and processing results into the RAM 212 and the HDD 213. In step S420, in response to the transmission from the image processing apparatus 101, of the file to be printed in step S414, the CPU 211 of the image processing server 105 receives the conversion instruction data and the file to be printed, and stores them in the RAM 212.

Next, in step S421, the CPU 211 interprets the conversion instruction data received in step S420, and determines the type of control program to be run and the like.

Next, in step S422, based on the conversion instruction data, the CPU 211 performs image processing on the file to be printed. Specifically, print data (page description language data) that can be processed by the image processing apparatus 101 is generated from the file to be printed by the processing of step S422. Lastly, in step S423, the CPU 211 of the image processing server 105 returns the image-processed print data to the image processing apparatus 101 that requested the processing, and finishes this processing.

Figure 5:
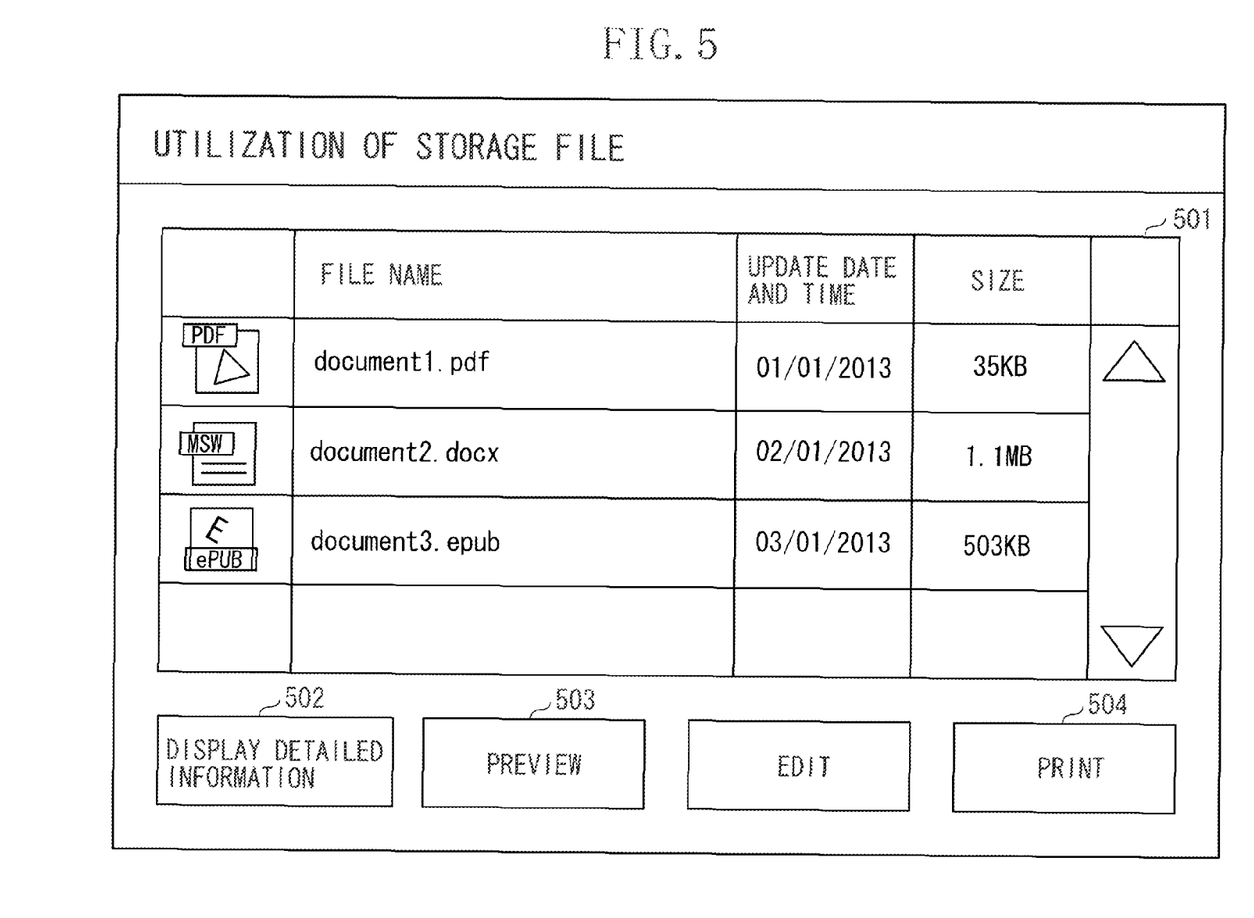
FIG. 5 illustrates a screen example of a file selection screen displayed on an operation unit.

FIG. 5 illustrates an example of a file selection screen displayed on the operation unit 303 by the image processing apparatus 101 illustrated in FIG. 3. This file selection screen is used for selecting a file that the user wants to operate on, from a desired directory in step S402. The file selection screen is configured from a file list display section 501, a detailed information display button 502, a preview display button 503, and a print button 504.

In FIG. 5, the file list display section 501 displays a list of the files stored in the directory selected by the user in step S401. In the present exemplary embodiment, an icon image, a file name, an update date and time, and a file size of each file are displayed. Files can be selected based on a user instruction. Processing performed by the image processing apparatus 101 to display the files in the file list display section 501 will be described in detail below. The icon image functions as an image for identifying the data format of the data to be printed.

The detailed information display button 502 is pressed in order to display further detailed information about a file selected in the file list display section. Specific examples of this detailed information include, but are not limited to, information about the creation date and time of the file, the user who created the file, and the file format name. Further, this detailed information may be any information that can be recognized by the image processing apparatus 101, such as meta data associated with the selected file.

The preview display button 503 is a button for displaying a preview image of the file selected by the user on the operation unit 303. In the present exemplary embodiment, the image processing at the time when displaying a preview image is realized by switching the image processing method based on the file format in the same manner as the print processing illustrated in FIGS. 4A and 4B. Namely, if it is determined in step S411 that the processing can be performed by the image processing apparatus 101, a preview image is generated by the image processing apparatus 101 as in step S412, and if the processing can be performed by the image processing server 105, a preview image is generated by the image processing server 105 as in steps S413 to S415. Then, the image processing apparatus 101 displays the preview image on the operation unit 303 instead of performing printing in step S416.

The print button 504 is a button for issuing an instruction to print the file selected by the user. Depending on the configuration of the image processing apparatus 101, a screen for issuing detailed printing instructions, such as stapling and two-sided printing, may be additionally displayed before printing.

Figure 6:
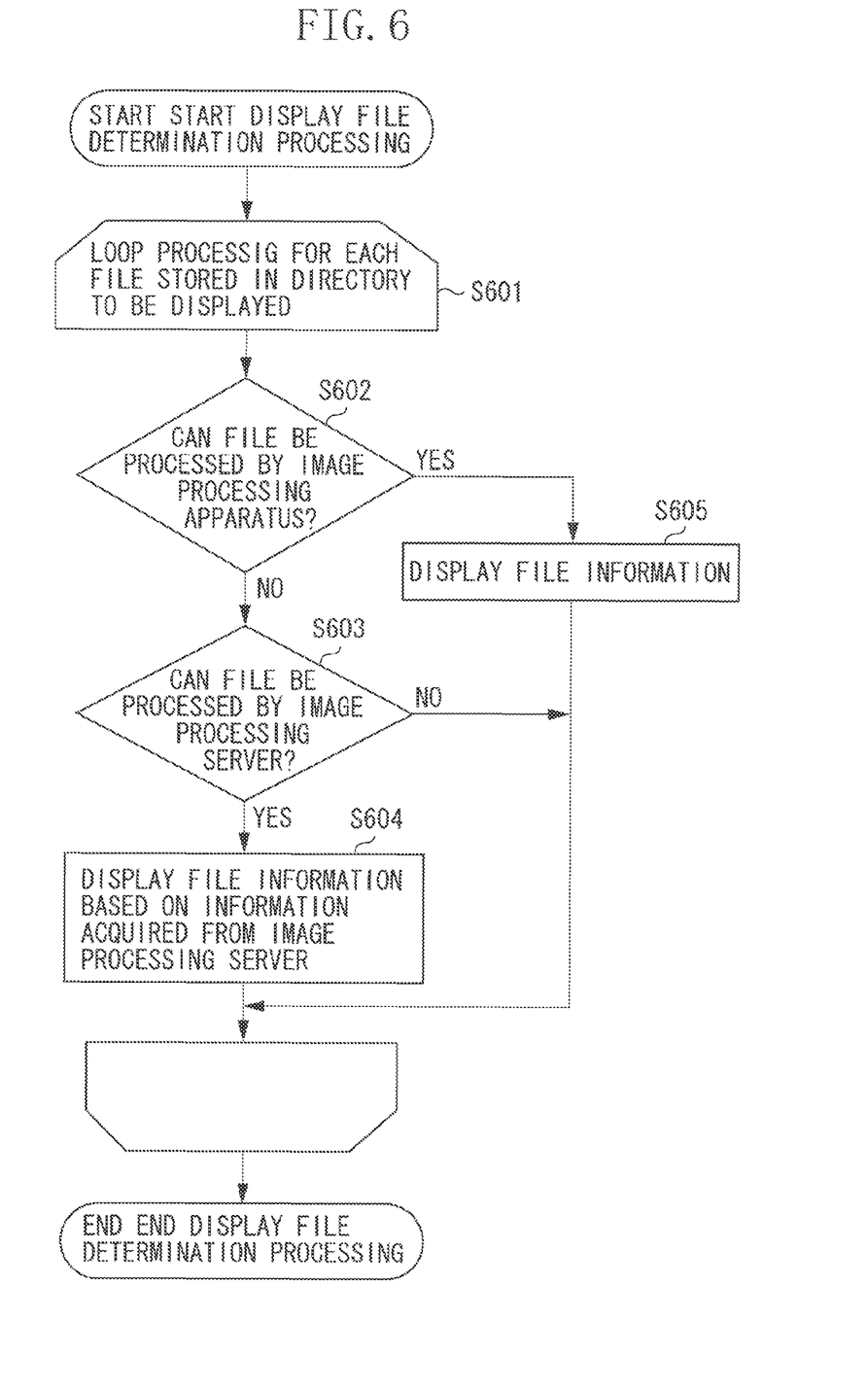
FIG. 6 is a flowchart illustrating an image processing apparatus control method.

FIG. 6 is a flowchart illustrating an image processing apparatus control method according to the present exemplary embodiment. This flowchart is a processing example of the image processing apparatus 101 illustrated in FIG. 3 displaying a file on the file list display section 501. In step S601, the CPU 311 of the image processing apparatus 101 acquires a list of the files stored in the directory specified in step S401, and executes loops of the following processing for each of these files.

First, in step S602, the CPU 311 determines whether the file format can be processed by the image processing apparatus 101. As a specific example of the determination method, the determination is made based on an extension attached to the file name. However, another method may also be used. If it is determined in step S602 that the file is in a format that can be processed by the CPU 311 (YES in step S602), the processing proceeds to step S605. In step S605, the CPU 311 displays the file on the file list display section 501, and the processing then returns to step S601, from which the processing is carried on.

On the other hand, if the CPU 311 determines in step S602 that the file format is not a format that it can process (NO in step S602), in step S603, the CPU 311 further determines whether the file can be processed by the image processing server 105. Specifically, the CPU 311 of the image processing apparatus 101 performs this determination based on information relating to the file formats supported by the image processing server which is acquired in advance from the image processing server 105 and stored in the HDD 313. Processing performed by the image processing apparatus 101 for acquiring in advance from the image processing server 105 the information relating to the supported file formats will be described below.

On the other hand, if the CPU 311 determines in step S603 that the file format cannot be processed even by the image processing server 105 (NO in step S603), the CPU 311 determines that this file cannot be processed by the image forming system. Consequently, the CPU 311 does not display the file, and the processing returns to step S601, from which the processing is carried on. The CPU 311 may also display, in a grayed-out state file information about a file that cannot be processed by either that image processing apparatus 101 or the image processing server 105 so that the user cannot select the file.

If the CPU 311 determines in step S603 that the file format can be processed by the image processing server 105 (YES in step S603), the processing proceeds to step S604. In step S604, the image processing apparatus 101 displays on the operation unit 303 the file information (e.g., an icon etc.) based on the information relating to the file format acquired from the image processing server 105, and the processing returns to step S601, from which the processing is carried on. Thus, if it is determined in step S603 that the file format cannot be processed even by the image processing server 105 (NO in step S603), since the CPU 311 executes display control processing that prevents the data from being selected as data to be printed, the CPU 311 does not have to execute processing in which the user mistakenly transmits the data to be printed to the image processing server 105.

By performing the above processing, the image processing apparatus 101 can display as a print candidate a file to be printed that is in a file format which can be processed by at least one of the image processing apparatus 101 and the image processing server 105. Further, a file in a file format that cannot be processed by either the image processing apparatus 101 or the image processing server 105 is displayed on the file selection screen in a manner that prevents it from being selected by the user as a print candidate.

Figure 7:
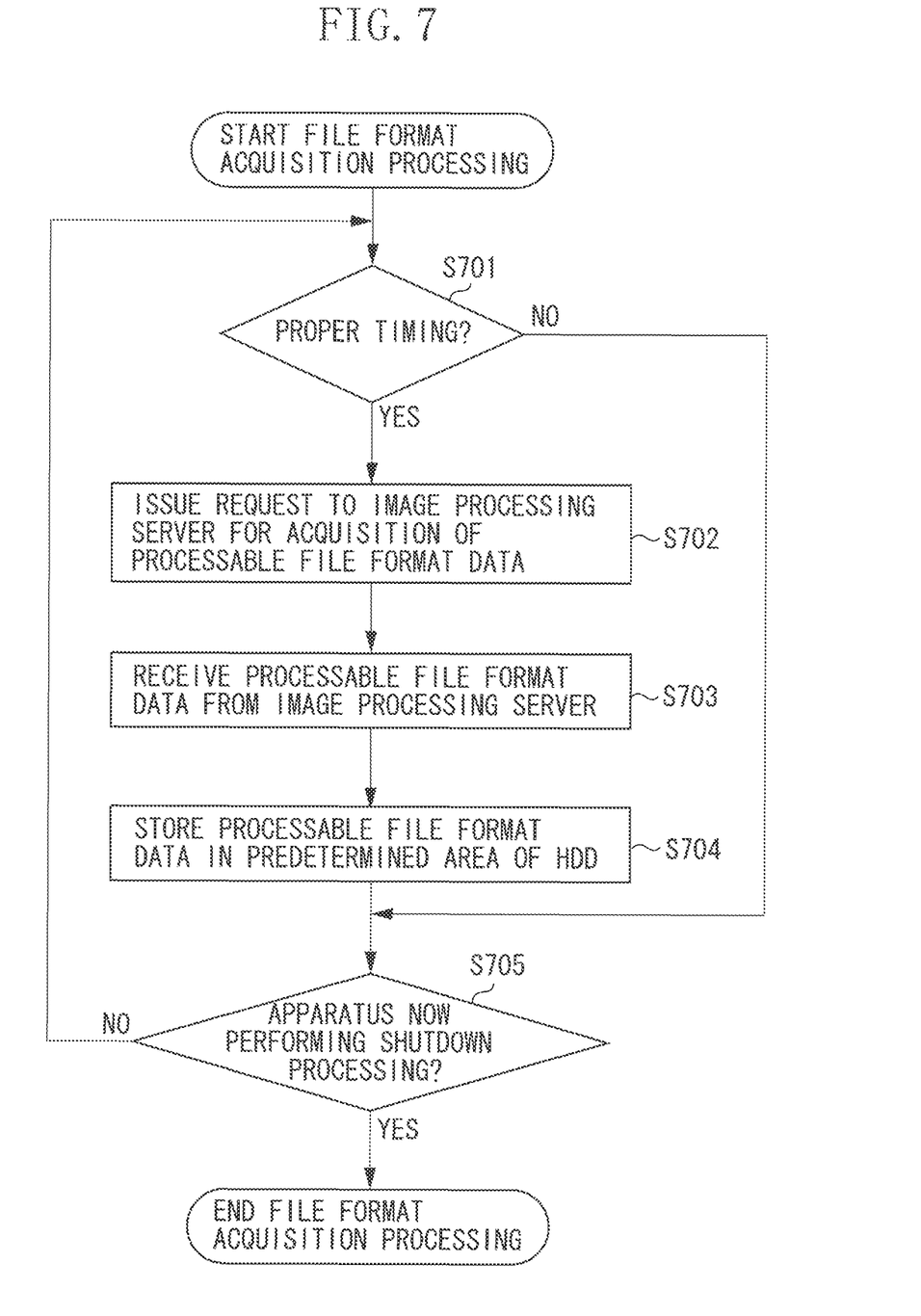
FIG. 7 is a flowchart illustrating an image processing apparatus control method.

FIG. 7 is a flowchart illustrating an image processing apparatus control method according to the present exemplary embodiment. This flowchart is a processing example in which the image processing apparatus 101 acquires from the image processing server 105 data relating to file formats that can be processed by the server (hereinafter referred to as "processable file format data").

First, in step S701, the CPU 311 of the image processing apparatus 101 determines whether it is now a proper timing to acquire the processable file format data. This proper timing may be determined by any method, as long as the timing is suitable for the image forming system. For example, the proper timing may be (1) immediately after the image processing apparatus 101 starts up, (2) a predetermined time, e.g., everyday at 00:00, after a fixed period has elapsed since startup, and (3) when a USB memory has been inserted and the like. The processable file format data may also be referred to as specific information indicating a function of the image processing server 105.

Next, in step S702, the CPU 311 issues an acquisition request for the processable file format data to the image processing server 105. Although this acquisition request is made by, for example, transmitting a hypertext transfer protocol (HTTP) GET method to the server, the request may also be made in another arbitrary protocol.

Next, in step S703, the CPU 311 receives the processable file format data from the image processing server 105 responding to the request made in step S702. The processable file format data will be described in detail below.

Next, in step S704, the CPU 311 stores the processable file format data received in step S703 in a predetermined area of the HDD 313. At this point, if processable file format data already exists in the predetermined area of the HDD 313, the image processing apparatus 101 overwrites this data. Namely, the latest processable file format data acquired from the image processing server 105 is stored in the predetermined area of the HDD 313.

Lastly, in step S705, the CPU 311 determines whether the image processing apparatus 101 has performed shutdown processing. If the CPU 311 determines that it has performed the shutdown processing (YES in step S705), the CPU 311 finishes the processing of this flowchart. If the CPU 311 determines that it has not performed shutdown processing (NO in step S705), the CPU 311 repeats the processing from step S701. By performing such processing, the CPU 311 of the image processing apparatus 101 can recognize the file formats that can be processed by the image processing server.

Figure 8:
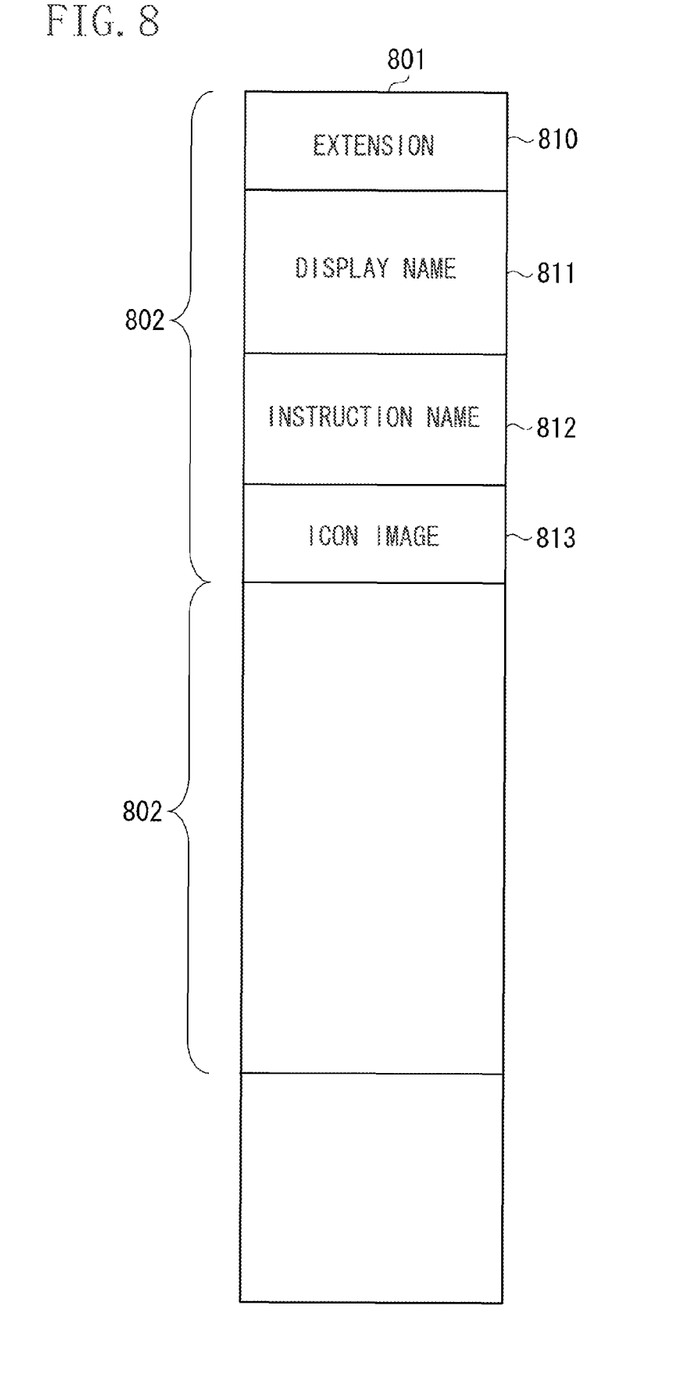
FIG. 8 is a diagram illustrating a configuration of received processable file format data.

FIG. 8 is a diagram illustrating a configuration of the processable file format data received by the image processing apparatus 101 in step S703. This data is generated by the image processing server 105 that received the acquisition request for the processable file format data in step S702. Processable file format data 801 is formed from a plurality of pieces of file format data 802.

In FIG. 8, one piece of file format data 802 is generated to correspond to one file format that can be processed by the image processing server 105. This file format data 802 is formed from an extension 810, a display name 811, an instruction name 812, and an icon image 813.

The extension 810 is data indicating an extension corresponding to a file format that can be processed by the image processing server 105. For example, an extension of a commonly known portable document format (PDF) file is "pdf". Although there is only one extension corresponding to the file format in a case of PDF, there are file formats that have a plurality of extensions. In such a case, a plurality of extensions may be provided.

The display name 811 is a file format name used at the time when the image processing apparatus 101 displays the name of the file format on the operation unit 303. The name stored as the display name 811 may be any name that allows the user of the image processing apparatus 101 to confirm the file format name. Further, if the image processing apparatus 101 supports displays for a plurality of countries and languages, the file format name may have a data structure by which each display name can be listed. In addition, display names may be described in a plurality of languages.

The instruction name 812 is a file format name used for specifying the file format of input data at the time when the image processing apparatus 101 requests the image processing server 105 to perform image processing in step S411. An example of a name that can be used includes Multipurpose Internet Mail Extensions (MIME) Content-Type. However, another format may be used, as long as it can be recognized by the image processing server 105.

The icon image 813 is an icon image for each file format, which is displayed for each file in the file list display section 501. The content of this image may be anything that allows the user of the image processing apparatus 101 to easily determine the file format.

Thus, in the present exemplary embodiment, it has been described that information relating to file formats that can be processed by the image processing server can be acquired by the image processing apparatus at a predetermined timing, and as a result, the user can select a suitable file, and this selection can be appropriately carried out even if the capabilities of the image processing server change. In addition, in the present exemplary embodiment, it has been also described that by acquiring information regarding file formats that can be processed by the image processing apparatus 101, before FIG. 5 is displayed, the file selection screen can be displayed more quickly on the operation unit 303. Consequently, the mistaken transmission by the user of a file that cannot be processed by the image processing server to the image processing server from the image processing apparatus can be prevented.

A second exemplary embodiment will now be described. It has been described in the first exemplary embodiment that the image processing apparatus acquires information relating to the file formats that can be processed by the image processing server, and thereby, the user can select a suitable file, and this selection can be appropriately carried out even if the capabilities of the image processing server change.

In the first exemplary embodiment, the user of the image processing apparatus 101 determines whether a file is a desired file based on the display name 811 and the icon image 813 in addition to the file name and the like. However, in some cases this determination can be performed more easily by displaying a thumbnail that reflects the content of the file. In the present exemplary embodiment, an example of a method for displaying a thumbnail that reflects the content of the file instead of the icon image 813 on the file selection screen of the image processing apparatus 101 will be described.

Figure 9:
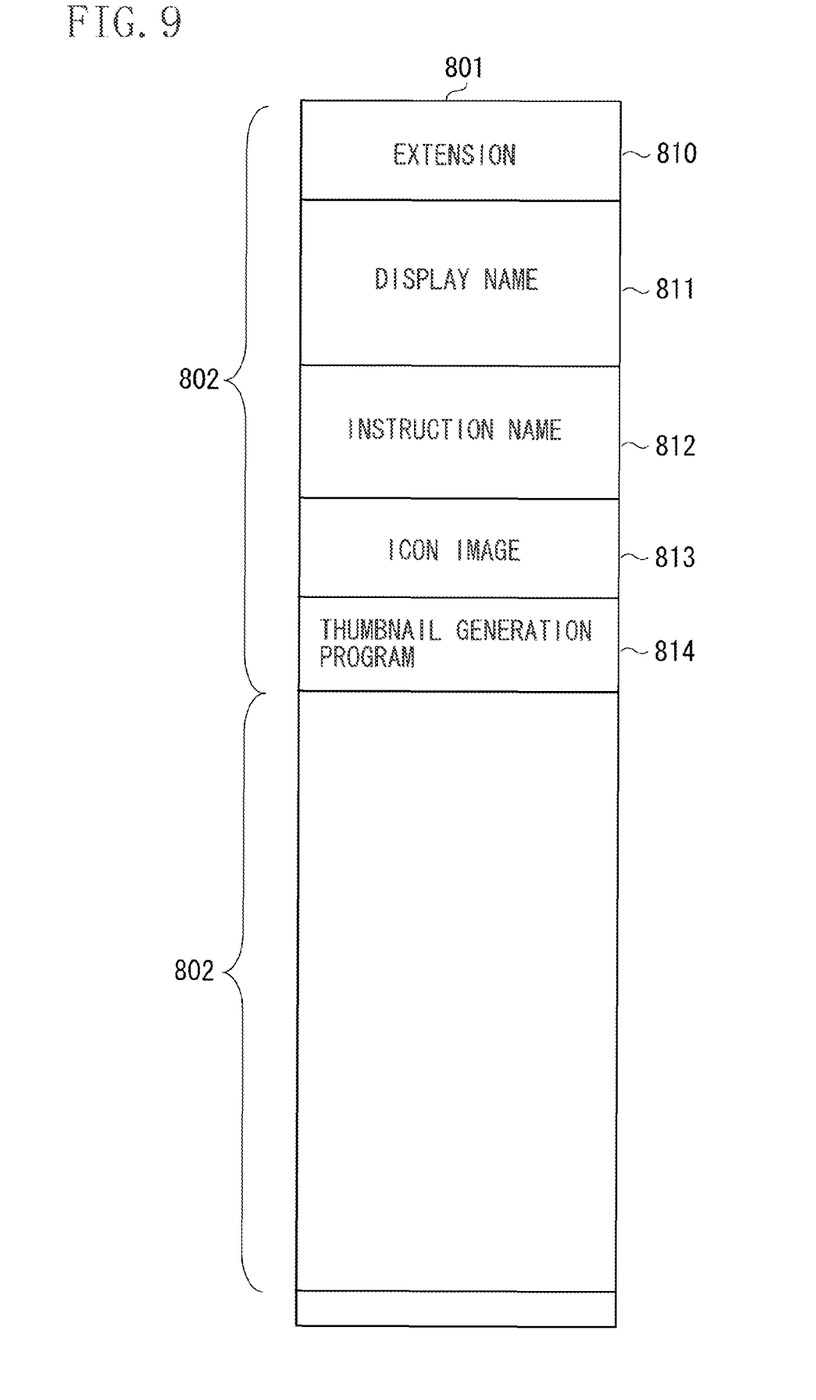
FIG. 9 is a diagram illustrating a configuration of received processable file format data.

FIG. 9 is a diagram illustrating a configuration of processable file format data received in step S703 by the image processing apparatus 101 according to the present exemplary embodiment.

In the present exemplary embodiment, a thumbnail generation program 814 is added to the file format data 802. The thumbnail generation program 814 is a program that can be executed by the CPU 311 of the image processing apparatus 101. When a file corresponding to the file format data 802 is input, the thumbnail generation program 814 can generate a thumbnail image reflecting the content of the file in this format.

Further, in the present exemplary embodiment, the flowchart of FIG. 6 is also changed as follows. In the first exemplary embodiment, when the image processing apparatus 101 displays file information, in step S604, the data described in the file format data 802 (e.g., an icon etc.) is utilized. In the present exemplary embodiment, instead of utilizing the icon image 813 during the processing of step S604, the image processing apparatus 101 executes the thumbnail generation program 814 and displays the obtained thumbnail image on the file list display section 501. Therefore, in the present exemplary embodiment, all of icons for each file are not the same and each of the icons reflects the content of the corresponding file.

Although the image processing apparatus 101 obtains a thumbnail image by executing a thumbnail generation program, from the perspective of converting a file selected by the user into a format that can be recognized by the image processing apparatus 101, the thumbnail image generation processing and step S414 are similar processing.

Therefore, in the present exemplary embodiment, in addition to the file to be processed, the thumbnail generation program 814 also receives a parameter such as the resolution of the output image, and performs image generation based on the parameter. This configuration can optimize the processing method according to the situation. For example, when performing processing with a parameter that has a resolution equal to or greater than a predetermined level during image processing of a file, the processing illustrated in step S414 is performed, while for an image that is equal to or less than the predetermined level, image processing is performed with the thumbnail generation program 814. This optimization is effective when the image processing apparatus 101 does not have an ability to perform high resolution image processing, for example.

In the present exemplary embodiment, although an example has been described in which a thumbnail reflecting the content of the file is displayed on the file list display section, the present exemplary embodiment may also be configured such that a predefined icon image can be displayed. For example, the present exemplary embodiment may be configured such that the image processing apparatus 101 has a setting value that can be changed by the user, and switch between displaying an icon image and displaying a thumbnail image based on the content of this setting value.

Thus, the image processing apparatus acquires a program for thumbnail generation in advance from the image processing server, and thereby can suppress deterioration in responsiveness even when a thumbnail reflecting the file content is presented to the user. Further, an optimum processing method can be selected according to the situation by automatically determining whether to issue a request to the image processing server to perform processing or to execute a program acquired in advance from the image processing server based on the image resolution, at the time of processing.

A third exemplary embodiment will now be described. In the second exemplary embodiment, it has been described that by generating a thumbnail using a thumbnail generation program received by the image processing apparatus 101 from the image processing server, a file list that reflects the file content can be provided while suppressing deterioration in image display responsiveness.

However, depending on the capabilities of the image processing apparatus and a thumbnail generation processing load in a specific file format, in some cases the thumbnail generation cannot be performed by the image processing apparatus, so that the image processing apparatus has to request the image processing server to perform the thumbnail generation. Even in such cases, deterioration in image display responsiveness needs to be prevented as much as possible.

In the present exemplary embodiment, a method for obtaining a thumbnail image by issuing a request to the image processing server to perform thumbnail generation, while suppressing deterioration in responsiveness for the user will be described.

Figure 10:
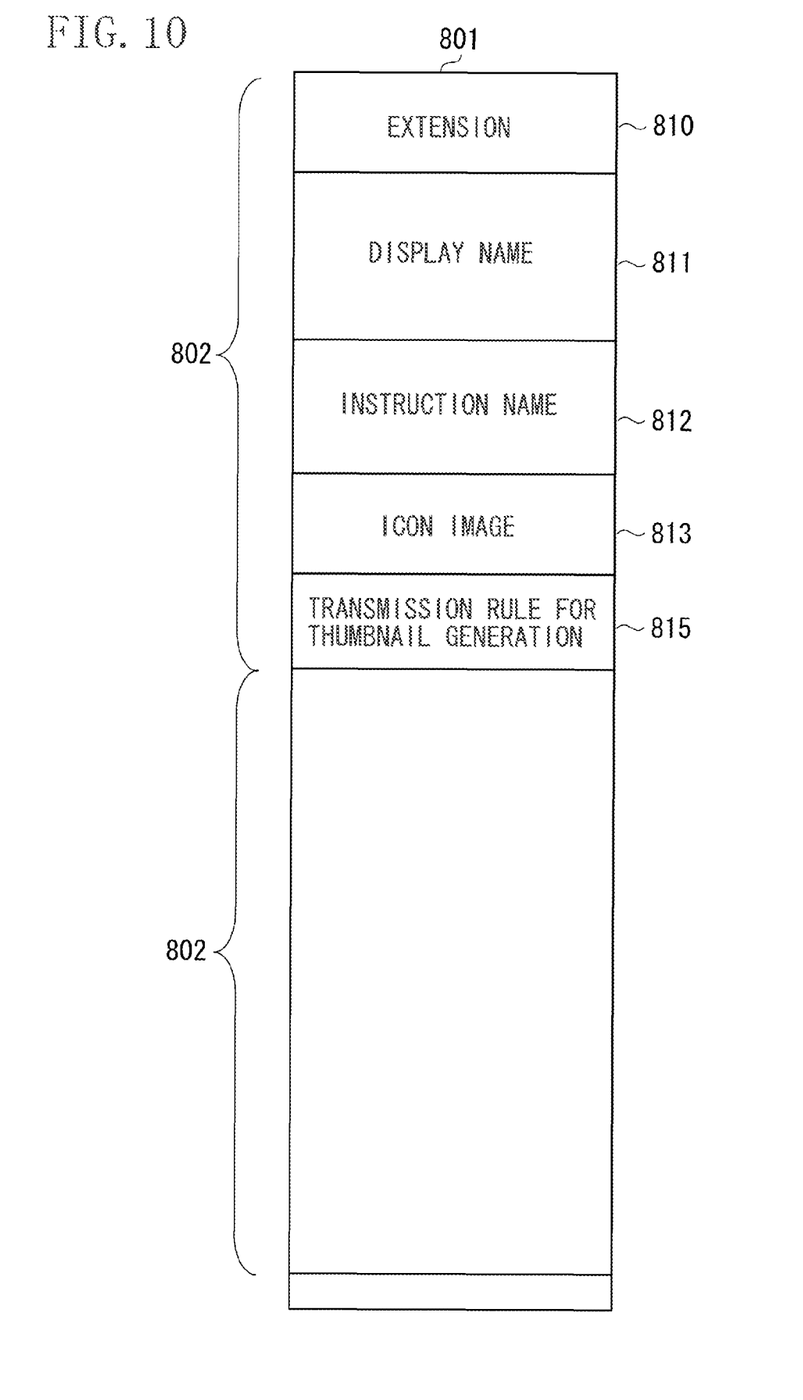
FIG. 10 is a diagram illustrating a configuration of received processable file format data

FIG. 10 is a diagram illustrating a configuration of processable file format data received by the image processing apparatus 101 according to the present exemplary embodiment in step S703.

In the present exemplary embodiment as illustrated in FIG. 10, a transmission rule 815 for thumbnail generation is added to the file format data 802. The transmission rule 815 for thumbnail generation defines the content of data to be transmitted at the time when the image processing apparatus 101 issues a request to the image processing server 105 to perform thumbnail generation. The transmission rule 815 for thumbnail generation contains information regarding what kind of data is required for thumbnail generation, such as "until 1 KB from the top of the file", "until a 0x123456 data pattern first appears from the top of the file", and "all of the file". This information may be expressed in an Extensible Markup Language (XML) format, like <PartialData origin="0" size=1024"/> for the case of "until 1 KB from the top of the file", for example. However, this information may be described in another format, as long as it can be recognized by the image processing apparatus 101.

Further, in the present exemplary embodiment, the flowchart of FIG. 6 is also changed as follows. In the second exemplary embodiment, the image processing apparatus 101 executes the thumbnail generation program 814 during the processing of step S604, and displays the obtained image on the file list display section 501. In contrast, in the present exemplary embodiment, in step S604, the image processing apparatus 101 refers to the transmission rule 815 for thumbnail generation corresponding to the file format of a file to be processed, and transmits only data specified by this rule to the image processing server 105. A thumbnail image is obtained as a response. In the present exemplary embodiment, extracted data to be printed that has a predetermined size is transmitted to the image processing server based on the transmission rule 815 for thumbnail generation.

Thus, deterioration in responsiveness for the user can be suppressed to a minimum by transmitting only the minimum amount of data required to display a thumbnail, when the image processing apparatus requests the image processing server to perform processing in order to display the thumbnail.

According to the above-described exemplary embodiment, the system can be controlled so that data to be printed that should not be converted by the server apparatus is not displayed.

Other Embodiments

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2013-144524 filed Jul. 10, 2013, which is hereby incorporated by reference herein in its entirety.

What is claimed is:

1. An image processing apparatus capable of communication with a server apparatus, the image processing apparatus comprising:
   a memory device that stores a set of instructions; and
   at least one processor that executes instructions in the memory device to:
   convert a file to be printed into printable print data;
   acquire specific information indicating a function of the server apparatus;
   store, in a storing unit, the acquired information indicating a function of the server apparatus;
   receive a designation of a directory in which one or more files are stored;
   determine, whether the one or more files stored in the designated directory are able to be converted into the printable print data by the image processing apparatus without any conversion by the server apparatus;
   determine, based on the information stored in the storing unit, whether the one or more files stored in the designated directory are not able to be converted into the print data by the image processing apparatus but are able to be converted into the printable print data by the server apparatus;
   display, based on whether the one or more files stored in the designated directory are able to be converted into the printable print data by the image processing apparatus itself and whether the one or more files stored in the designated directory are able to be converted into the printable print data by the server apparatus, file information indicating one or more files which are able to be converted into the printable print data by at least one of the image processing apparatus and the server apparatus, wherein information used for displaying the file information is generated by the server apparatus;
   accept a selection by a user of a file among one or more files indicated by the displayed file information;
   transmit a request for converting the file selected by the user into the printable print data to the server apparatus, in a case where the image processing apparatus is not able to convert the file selected by the user;
   receive the printable print data from the server apparatus in response to a transmission of the request; and
   control a print unit to print the printable print data converted by the image processing apparatus or received from the server apparatus.

2. The image processing apparatus according to claim 1, wherein the at least one processor executes instructions in the memory device to:
   perform control so that the file which is not able to be converted into the printable print data by the image processing apparatus and the server apparatus is not displayed.

3. The image processing apparatus according to claim 1, wherein the at least one processor executes instructions in the memory device to:
   acquire the information indicating the function of the server apparatus from the server apparatus in response to a startup of the image processing apparatus or a connection of a USB memory with the image processing apparatus.

4. The image processing apparatus according to claim 1, wherein the acquired information includes data specifying a format of data to be printed, an icon image identifying the data format, a thumbnail generation program, and a transmission rule for thumbnail generation, wherein the image processing apparatus generates the thumbnail using the generation program and when the image processing apparatus does not generate the thumbnail, the image processing apparatus transmits data for generating the thumbnail to the server apparatus, the data for generating the thumbnail being transmitted to the server apparatus by the image processing apparatus according to the transmission rule to let the server apparatus generate the thumbnail.

5. The image processing apparatus according to claim 1, wherein the at least one processor executes instructions in the memory device to:

display either an icon image acquired from the server apparatus or a thumbnail image generated by a thumbnail generation program when displaying data to be printed that is able to be converted by at least one of the or the server apparatus.

6. The image processing apparatus according to claim 1, wherein the at least one processor executes instructions in the memory device to:

transmit extracted data to be printed that has a predetermined size to the server apparatus based on an acquired transmission rule for thumbnail generation.

7. A method for controlling an image processing apparatus capable of communication with a server apparatus, the method comprising:

acquiring specific information indicating a function of the server apparatus;

storing the acquired specific information indicating a function of the server apparatus;

first receiving a designation of a directory in which one or more files are stored;

first determining, whether the one or more files stored in the designated directory are able to be converted into printable print data without any conversion by the server apparatus;

second determining, based on the information stored in the storing unit whether the one or more files stored in the designated directory are not able to be converted into the print data by the image processing apparatus but are able to be converted into the printable print data by the server apparatus;

displaying, based on whether the one or more files stored in the designated directory are able to be converted into the printable print data by the image processing apparatus itself and whether the one or more files stored in the designated directory are able to be converted into the printable print data by the server apparatus, file information indicating one or more files which are able to be converted into the printable print data by at least one of the image processing apparatus and the server apparatus, wherein information used for displaying the file information is generated by the server apparatus;

accepting a selection by a user of a file among one or more files indicated by the displayed file information;

converting data to be printed into the printable print data, in a case where it is determined that the image processing apparatus is able to convert the file selected by the user;

transmitting a request for converting the file selected by the user into the printable print data to the server apparatus, in a case where it is determined that the image processing apparatus is not able to convert the file selected by the user;

second receiving the printable print data from the server apparatus in response to a transmission of the request; and printing the converted printable print data or the second received printable data received from the server apparatus.

8. The method for controlling an image processing apparatus according to claim 7, wherein the control is performed so that the file which is not able to be converted into the printable print data and the server apparatus is not displayed.

9. The method for controlling an image processing apparatus according to claim 7, wherein in the acquisition of the data, the information indicating the function of the server apparatus is acquired from the server apparatus in response to a startup of the image processing apparatus or a connection of a USB memory with the image processing apparatus.

10. The method for controlling an image processing apparatus according to claim 7, wherein the acquired information includes data specifying a format of data to be printed, an icon image identifying the data format, a thumbnail generation program, and a transmission rule for thumbnail generation, wherein the image processing apparatus generates the thumbnail using the generation program and when the image processing apparatus does not generate the thumbnail, the image processing apparatus transmits data for generating the thumbnail to the server apparatus, the data for generating the thumbnail being transmitted to the server apparatus by the image processing apparatus according to the transmission rule to let the server apparatus generate the thumbnail.

11. The method for controlling an image processing apparatus according to claim 7, wherein the control is performed to display either an icon image acquired from the server apparatus or a thumbnail image generated by a thumbnail generation program when displaying data to be printed that is able to be converted by at least one of the image processing apparatus or the server apparatus.

12. The method for controlling an image processing apparatus according to claim 7, further comprising transmitting extracted data to be printed that has a predetermined size to the server apparatus based on an acquired transmission rule for thumbnail generation.

13. A non-transitory computer-readable storage medium storing computer executable instructions that cause a computer to execute a method, the method comprising:

acquiring specific information indicating a function of the server apparatus;

storing the acquired specific information indicating a function of the server apparatus;

first receiving a designation of a directory in which one or more files are stored;

first determining, whether the one or more files stored in the designated directory be converted into the printable print data without any conversion by the server apparatus;

second determining, based on the information stored in the storing unit whether the one or more files stored in the designated directory are not able to be converted into the print data by the image processing apparatus but are able to be converted into the printable print data by the server apparatus;

displaying, based on whether the one or more files stored in the designated directory are able to be converted into the printable print data by the image processing apparatus itself and whether the one or more files stored in the designated directory are able to be converted into the printable print data by the server apparatus, file information indicating one or more files which are able to be converted into the printable print data by at least one of the image processing apparatus and the server apparatus, wherein information used for displaying the file information is generated by the server apparatus;

accepting a selection by a user of a file among one or more files indicated by the displayed file information;

converting data to be printed into printable print data, in a case where it is determined that the image processing apparatus is able to convert the file selected by the user;

transmitting a request for converting the file selected by the user into the printable print data to the server apparatus, in a case where it is determined that the image processing apparatus is not able to convert the file selected by the user;

second receiving the printable print data from the server apparatus in response to a transmission of the request; and printing the converted printable print data or the second received printable data received from the server apparatus.

14. The image processing apparatus according to claim 1, wherein the at least one processor executes instructions in the memory device to:

acquire, before the designation of the directory in which the one or more files are stored is received, the information indicating the function of the server apparatus.

* * * * *